United States Patent [19]

Egan et al.

[11] Patent Number: 5,491,786
[45] Date of Patent: Feb. 13, 1996

[54] METHOD AND SYSTEM FOR MANAGEMENT OF UNITS WITHIN A DATA PROCESSING SYSTEM

[75] Inventors: Patrick K. Egan, Rochester; Gene A. Ohnstad, Oronoco, both of Minn.

[73] Assignee: International Business Machines Corporation, Armonk, N.Y.

[21] Appl. No.: 30,760

[22] Filed: Mar. 12, 1993

[51] Int. Cl.[6] .............................. G06F 11/00; G06F 9/00
[52] U.S. Cl. .................... 395/180; 395/650; 364/281.6
[58] Field of Search ............................ 371/11.1; 395/575, 395/650, 180; 364/294.4, 230.3, 241, 281, 281.6

[56] References Cited

U.S. PATENT DOCUMENTS

| | | | |
|---|---|---|---|
| 4,394,727 | 7/1983 | Hoffman et al. | 364/200 |
| 4,817,091 | 3/1989 | Katzman et al. | 371/9 |
| 4,850,027 | 7/1989 | Kimmel | 382/49 |
| 4,870,704 | 9/1989 | Matelan et al. | 364/200 |
| 5,185,861 | 2/1993 | Valencia | 395/200 |

*Primary Examiner*—Robert W. Beausoliel, Jr.
*Assistant Examiner*—Norman M. Wright
*Attorney, Agent, or Firm*—Duke W. Yee; Andrew J. Dillon

[57] ABSTRACT

A method and system for managing a plurality of units, wherein the data processing system requires a selected capacity provided by a number of units. The units are dynamically polled to determine a capacity of the plurality of units. The requirement of the data processing system for the output of the redundant units is also dynamically determined. An indication that a condition exists in which at least one of the units should be replaced is generated only if the requirement of the data processing system is greater than the capacity of the units after the next failure of a unit, wherein replacement of a unit is not required unless the hardware or data processing system demand, as currently configured, exceeds the capacity of the units after the next failure of a unit.

22 Claims, 7 Drawing Sheets

METHOD AND SYSTEM FOR MANAGEMENT OF UNITS WITHIN A DATA PROCESSING SYSTEM

BACKGROUND OF THE INVENTION

1. Technical Field

The present invention relates in general to improved hardware redundancy and in particular to a method and system for providing a system for improving reliability of hardware or data processing systems employing redundant units. Still more particularly, the present invention relates to a method and system for improving reliability of hardware or data processing systems by providing a system for management of redundant units.

2. Description of the Related Art

As the demand for reliability of electronic equipment and other hardware increases, the use of hardware redundancy has become more common. Hardware redundancy may take the form of (1) complete redundancy, which doubles the hardware, or (2) N+1 redundancy, where several units share the load and one unit beyond what is required to service the maximum load is provided. Thus, if one unit fails, the remaining N units can normally handle the load or demand until a repair or replacement of the failed unit can be made. These units may be identical in nature or may have differing capabilities and features.

One draw back or disadvantage to redundant systems is an increase in system failure rate due to the increased hardware present within the system; N+1 units are present instead of N units. As a result, more units are present for failure. Many times, more repairs are required to maintain a redundant hardware system. Another drawback in systems which attempt to guarantee redundancy is that N must be large enough to handle the worst case loading or usage within a system. Consequently, an excess of hardware may be supplied for the normal case loading or usage, especially in a system that provides for selectable features which is not normally configured to utilize a maximum capability.

For example, in a power regulator system implemented in a data processing system, parallel power supplies may share an output current to support an N+1 environment in the data processing system. In designing the power regulator configuration, the maximum load that may be required by the data processing system is utilized to determine the number of power regulators required for an N+1 environment. Depending on the various features and devices that may be selected for utilization in conjunction with the data processing system, the actual power required by the data processing system may vary, resulting in an inefficient use of the power regulators.

In an N+1 design, a failure of a power regulator may result in a N environment, requiring replacement of the failed power regulator. In many cases, however, the power regulators still functioning are sufficient to support an N+1 environment for the currently selected features. In known design redundant hardware systems, however, such a situation is not taken into account.

Therefore, it would be desirable to have a method and system for managing hardware redundancy within a hardware or data processing system to accurately determine when redundant units should be replaced or added.

SUMMARY OF THE INVENTION

It is therefore one object of the present invention to provide improved hardware redundancy.

It is another object of the present invention to provide a method and system for providing a system for improving reliability of hardware or data processing systems employing redundant units.

It is yet another object of the present invention to provide a method and system for improving reliability of hardware or data processing systems by providing a system for management of redundant units.

The foregoing objects are achieved as is now described. The present invention provides a method and system for managing a plurality of units, wherein the data processing system requires a selected capacity provided by a number of units. The units are dynamically polled to determine a capacity of the plurality of units. The requirement of the data processing system for the output of the redundant units is also dynamically determined. An indication that a condition exists in which at least one of the units should be replaced is generated only if the requirement of the data processing system is greater than the capacity of the units after the next failure of a unit, wherein replacement of a unit is not required unless the hardware or data processing system demand, as currently configured, exceeds the capacity of the units after the next failure of a unit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention provides a method and system for minimizing the disadvantages of a redundant hardware system by dynamically detecting the existence of an N+1 capability based on the actual hardware system requirements, i.e., loading or usage. The data collected through this dynamic detection is utilized to determine the value of "N" required for the hardware system to operate without failure. Additionally, this data may be utilized to make repair decisions based on the actual requirements of the hardware system, as currently configured, rather than on the worst case designing of the hardware system, in accordance with a preferred embodiment of the present invention.

Figure 1:
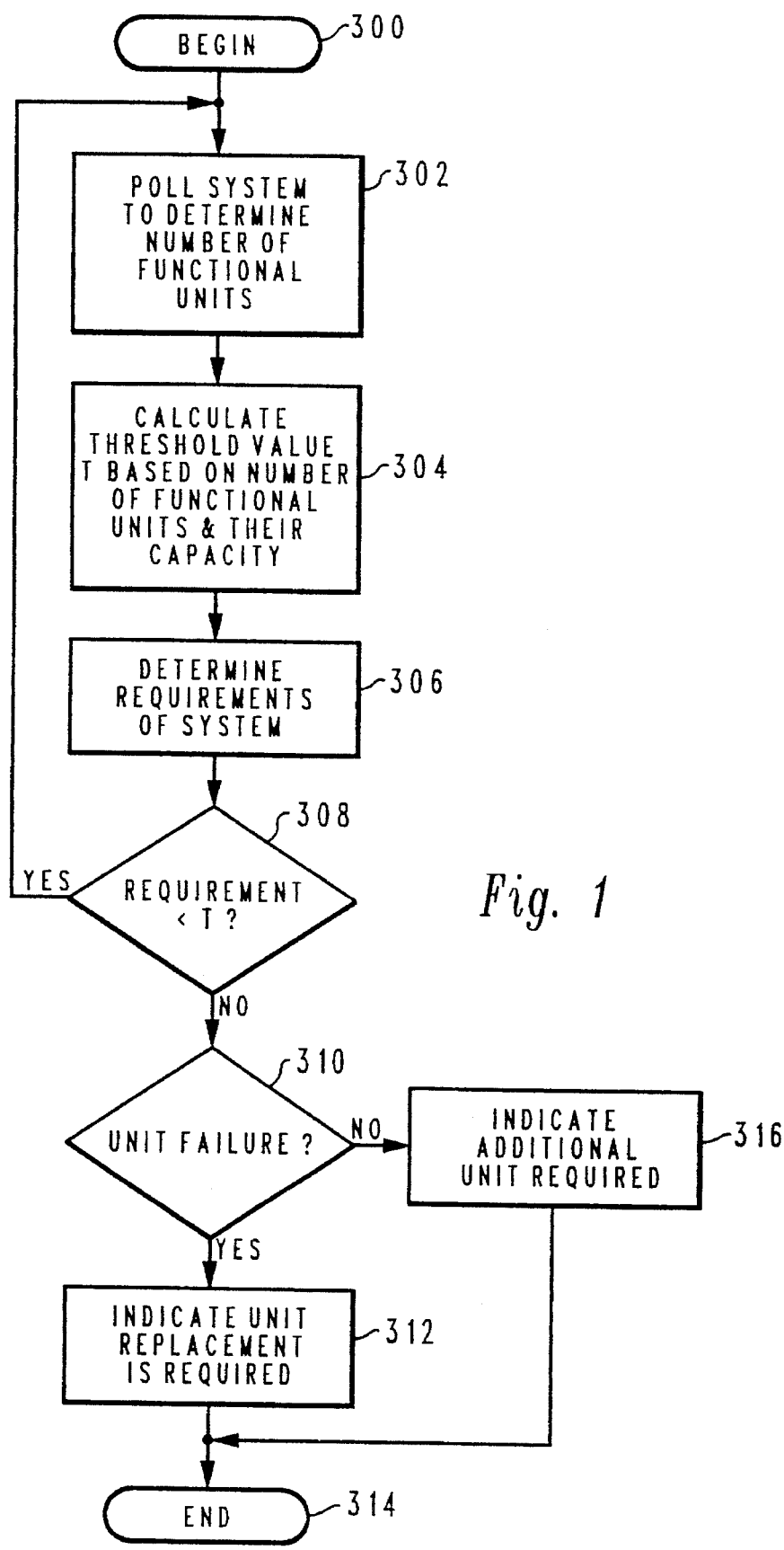
FIG. 1 depicts a method and system for managing redundant units in a hardware system is depicted in accordance with a preferred embodiment of the present invention.

With reference now to the figures and in particular with reference to FIG. 1, a method and system for managing units in a hardware system is depicted in accordance with a preferred embodiment of the present invention. The process begins at block 300 and thereafter proceeds to block 302. Block 302 illustrates the polling of the system to determine the number of functional units present within the hardware system. Thereafter, the process proceeds to block 304, which depicts a calculation of a threshold value T based on the number of functional units available and the capacity of the functional units. Afterward, the process proceeds to block 306, which depicts a determination of the requirement of the hardware system. The "requirement" is the demand by the hardware system for a selected amount of capacity being provided by the units, for example, current from power regulators, processing power for various computations in a data processing system, or storage space in one or more disk drives.

The process then proceeds to block 308, which illustrates a determination of whether or not the demand is less than or equal to the threshold value T. If the demand is greater than the threshold value T, the process then proceeds to block 310. Block 310 illustrates a determination of whether or not any units have failed. If any of the units have failed, the process then proceeds to block 312. Block 312 illustrates an indication that unit replacement is required. Thereafter, the process terminates, as illustrated in block 314.

Referring again to block 310, if a unit has not failed, the process than advances to block 316, which illustrates an indication that an additional unit is required. Afterward, the process terminates as illustrated in block 314. Referring again to block 308, if the demand is less than or equal to the threshold value T, the process then returns to block 302 to continue monitoring the hardware system.

The threshold value T is preferably based on the number of good or functioning units and the capacity of each of the units. The threshold value T may be selected in a variety of ways. Threshold value T is typically selected to be the threshold between an N+1 environment and an N environment. Alternatively, the threshold value T may define the threshold at which a hardware system will fail if the units cannot supply the capacity required to meet the system's requirements. Capacity may be expressed in terms of the number of units, the capability of each or all of the units or both. The initial capacity of the units may be selected using various standards; for example, the initial capacity of the units may be selected to provide an N+1 environment. An N+1 environment is an arbitrary environment selection, other environments such as an N+2 environment, an N+ environment, an N+4 environment, etc. may be selected in accordance with a preferred embodiment of the present invention.

Figure 2:
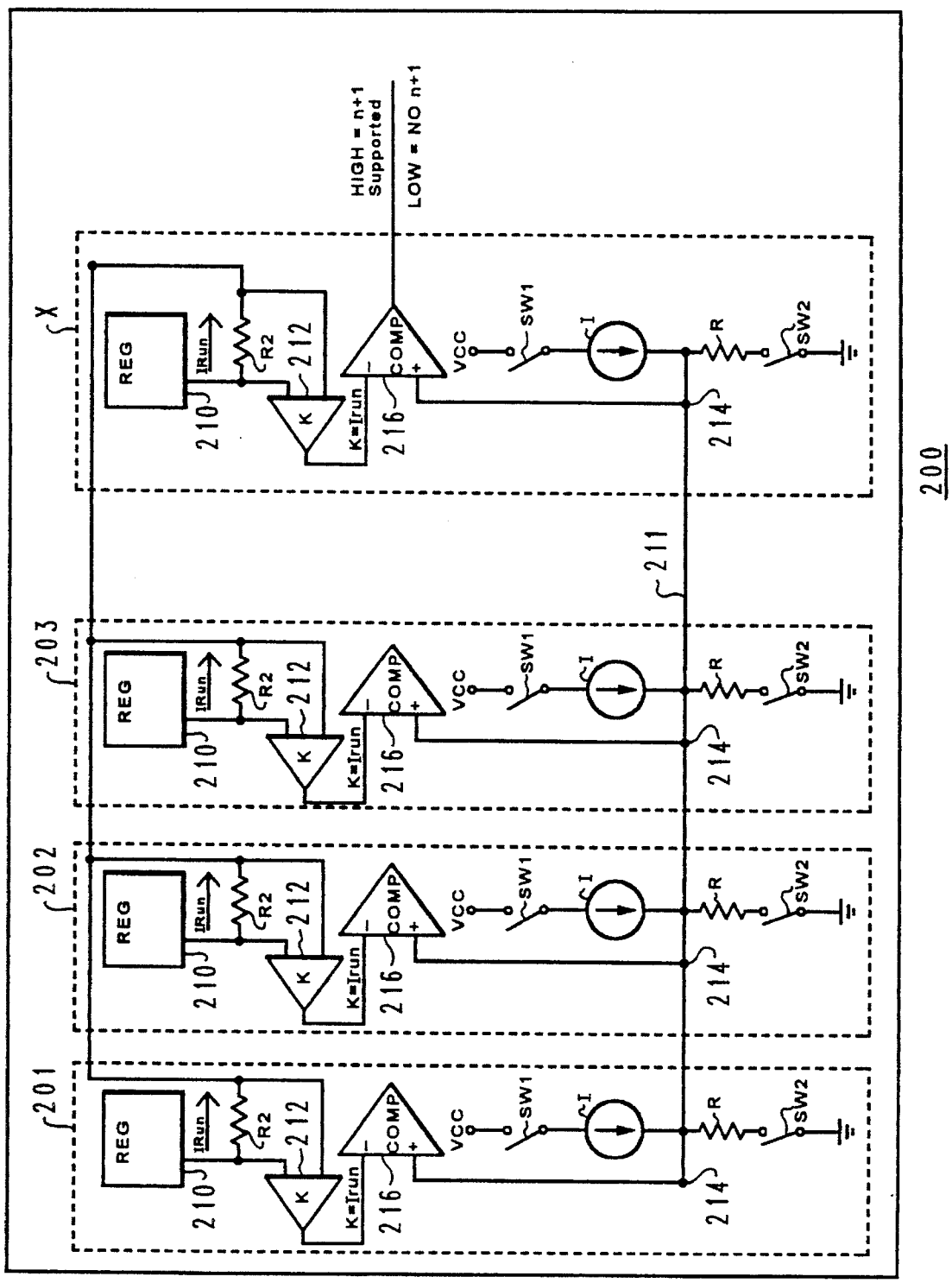
FIG. 2 is a block diagram of a power regulator system provided in accordance with a preferred embodiment of the present invention.

Referring now to FIG. 2, a block diagram of a power regulator system is depicted in accordance with a preferred embodiment of the present invention. Regulator system 200 includes a plurality of regulator units 201, 202, 203, ... X.

Regulator system 200 is preferably a system with a so-called floating master control, well known to those skilled in the art. In such a system, one of the regulators is the master and the remaining regulators are the slaves. Each regulator unit includes a regulator unit 210 having an output "$I_{run}$", a resistor R2 connected to the output, and a sense amplifier 212 having a gain of K which has its inputs connected on either side of resistor R2. Each regulator unit also includes two switches SW1 and SW2 with a current source I and a resistor R connected in series between the two switches. SW1 is connected to a voltage source and SW2 is connected to ground. This series arrangement is connected to Bus 211 at node 214 in each regulator unit. Switch SW1 is set "on" in all slave units, "off" in the master units, and "off" in all failed units. Switch SW2 is set "on" in all running units and "off" in any failed units.

Bus 211 is connected to comparator 216. Additionally, the output from sense amplifier 212 is also connected to the input of comparator 216. A high logic signal from comparator 216 indicates that an N+1 environment is supported and a low logic signal indicates that an N+1 is not supported within the regulator system 200, in accordance with a preferred embodiment of the present invention.

In the depicted embodiment, all of the regulator units are substantially equal in capability and each has a comparator to determine whether or not an N+1 environment is supported. Other methods for sensing currents well known to those skilled in the art may be utilized in accordance with a preferred embodiment of the present invention. For example, a single comparison may be made utilizing the sum of the currents from all of the regulators in a situation in which regulator units may not have the same output capability.

In parallel power supplies systems that share output current to support an N+1 environment, such as the one depicted in FIG. 2, the present invention may be implemented utilizing a variety of circuits known to those skilled in the art. The depicted embodiment determines whether or not an N+1 environment is present utilizing the maximum rated output current of a single regulator, "$I_{max}$". The load is determined by the actual operating current of a single regulator, Irun. The threshold current, "$I_{trh}$", which is equal to the maximum allowable individual regulator current while still maintaining an N+1 environment, is calculated for the system. $I_{trh}$ may be determined by:

$$I_{trh} = I_{max} - I_{max}/M = I_{max}*(1-1/M)$$

where M is the number of operating regulators. An N+1 environment is supported if:

$I_{run} \leq I_{trh}$

Otherwise, an N+1 environment is not present. Note that $M*(I_{trh}) = I_{max}*(M-1)$ = maximum system load in an N+1 environment. Itrh is derived from the total current, Itotal. For a non N+1 environment:

$I_{total} = N*I_{max}$ where N is the number of required regulators, M is the number of operating regulators, and M=N. In the situation where an N+1 environment is supported, the number of operating regulators is one more than the required number (M=N+1). Thus, at maximum load:

$$I_{total} = N*I_{max} = (M-1)*I_{max}$$

Then $$I_{trh} = I_{run} = I_{total}/(N+1) = I_{total}/M = (M-1)*I_{max}/M$$

As a result, $I_{trh} = I_{max} - I_{max}/M$.

Referring again to FIG. 2, M is determined by the number of good units indicated by the number of switch SW2's in the on position. M−1 is indicated by the number of switch SW1's in the on position (since the master control unit switch is off).

Figure 3:
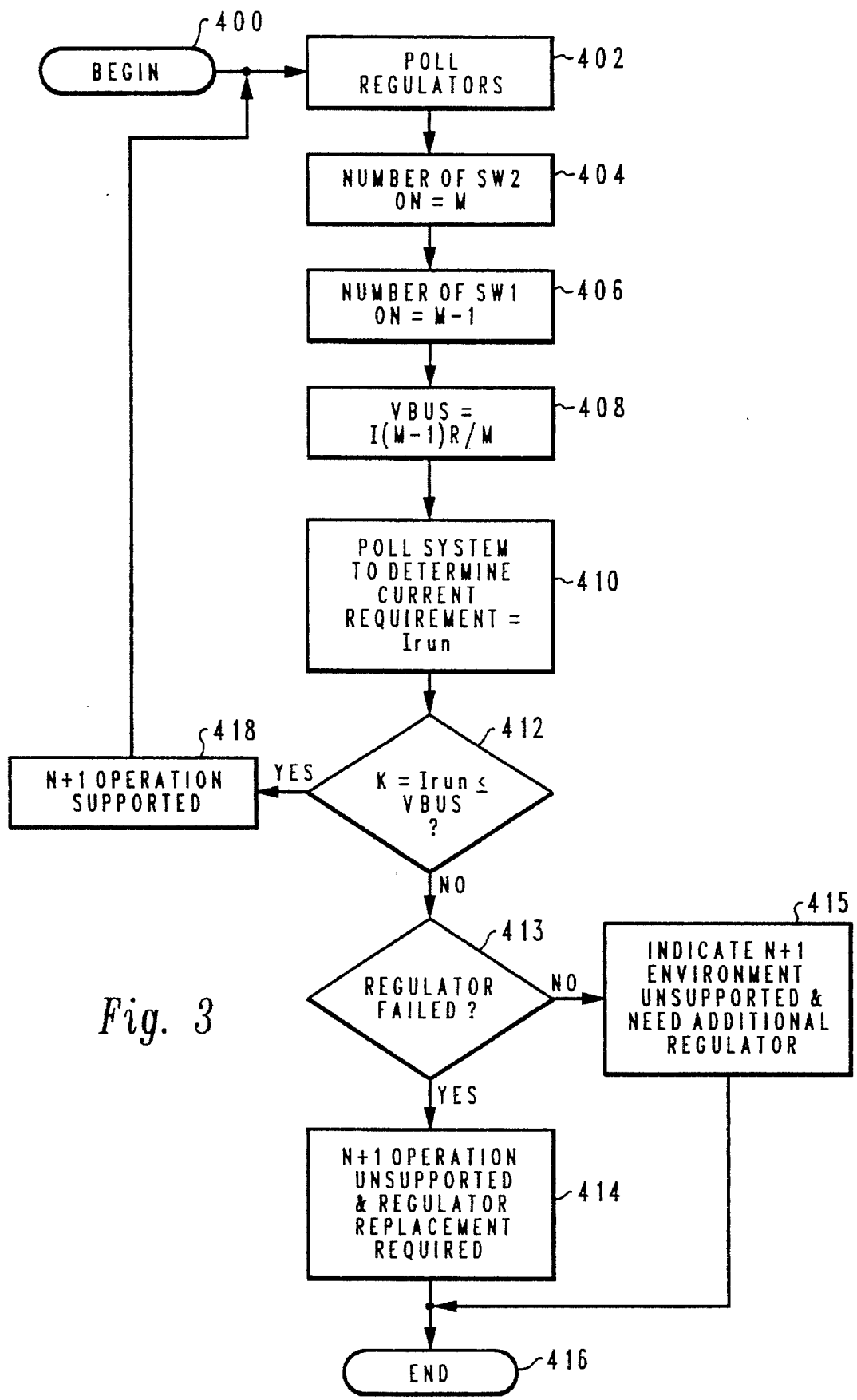
FIG. 3 depicts a high level logic flowchart of a method and system for managing a power regulator in accordance with a preferred embodiment of the present invention.

Referring now to FIG. 3, a high level flowchart of a method and system for managing a power regulator is depicted in accordance with a preferred embodiment of the present invention. In the depicted embodiment, the units are the power regulators depicted in FIG. 2, each of which has a capability or capacity to supply current to a hardware system, such as a data processing system.

The process begins as illustrated in block 400 and thereafter proceeds to block 402, which depicts detecting the number of operating regulators (M). The process then advances to block 404. Block 404 illustrates the setting of M equal to the number of SW2 switches in the "on" position. Thereafter, the process proceeds to block 406 where the number of SW1 switches in the "on" position is equal to M−1.

Afterward, the process then proceeds to block 408. Block 408 depicts setting the threshold VBUS, equal to I*R*(1−1/M). In accordance with a preferred embodiment of the present invention, currents are converted to voltages for comparison. VBUS is equal to $I*R*(1-1/M)=K*I_{trh}=K*I_{max}*(1-1/M)$. K is the gain value of sense amplifier 212. VBUS is proportional to $I_{trh}$ and can be compared to $I_{run}$ in each unit. VBUS is calculated in terms of voltage and is derived from the threshold current of the system, which is equal to the maximum allowable individual regulator current while maintaining an N+1 system redundancy.

$$I_{trh}=I_{max}-I_{max}/M=I_{max}(1-1/M)$$

where $I_{max}$ is the maximum rated output current of a single regulator, Irun is the actual operating current of a single regulator, and M is equal to the number of operating regulators. If $I_{run}$ is less than or equal to Itrh then an N+1 environment is supported. Otherwise, an N+1 environment is not supported.

Next, the process proceeds to block 410. Block 410 depicts the polling of the hardware system to determine the current demand, which is set equal to $I_{run}$. The process then advances to block 412, which illustrates a determination of whether or not $K*I_{run}$ is less than or equal to VBUS. $I_{run}$ is greater than VBUS, the process then advances to block 413, which illustrates a determination of whether or not a regulator has failed. If a regulator has failed, the process then passes to block 414, which depicts indicating that N+1 operation is unsupported and regulator replacement is required. The process then terminates in block 416.

Referring back to block 413, if a regulator has not failed, the process then advances to block 415, which depicts an indication that an N+1 environment cannot be supported and that an additional regulator should be added to the hardware system. This block indicates a situation in which the configuration of the hardware system did not take into account the worst case situation for power demand within the hardware system, thus another regulator needs to be installed. Such a situation may occur, for example, by additional power demand resulting from increased load to the hardware system.

Referring again to block 412, if $I_{run}$ is less than or equal to VBUS, the process then advances to block 418. Block 418 illustrates an indication that N+1 operation is supported. Afterward, the process returns to block 402.

Figure 4:
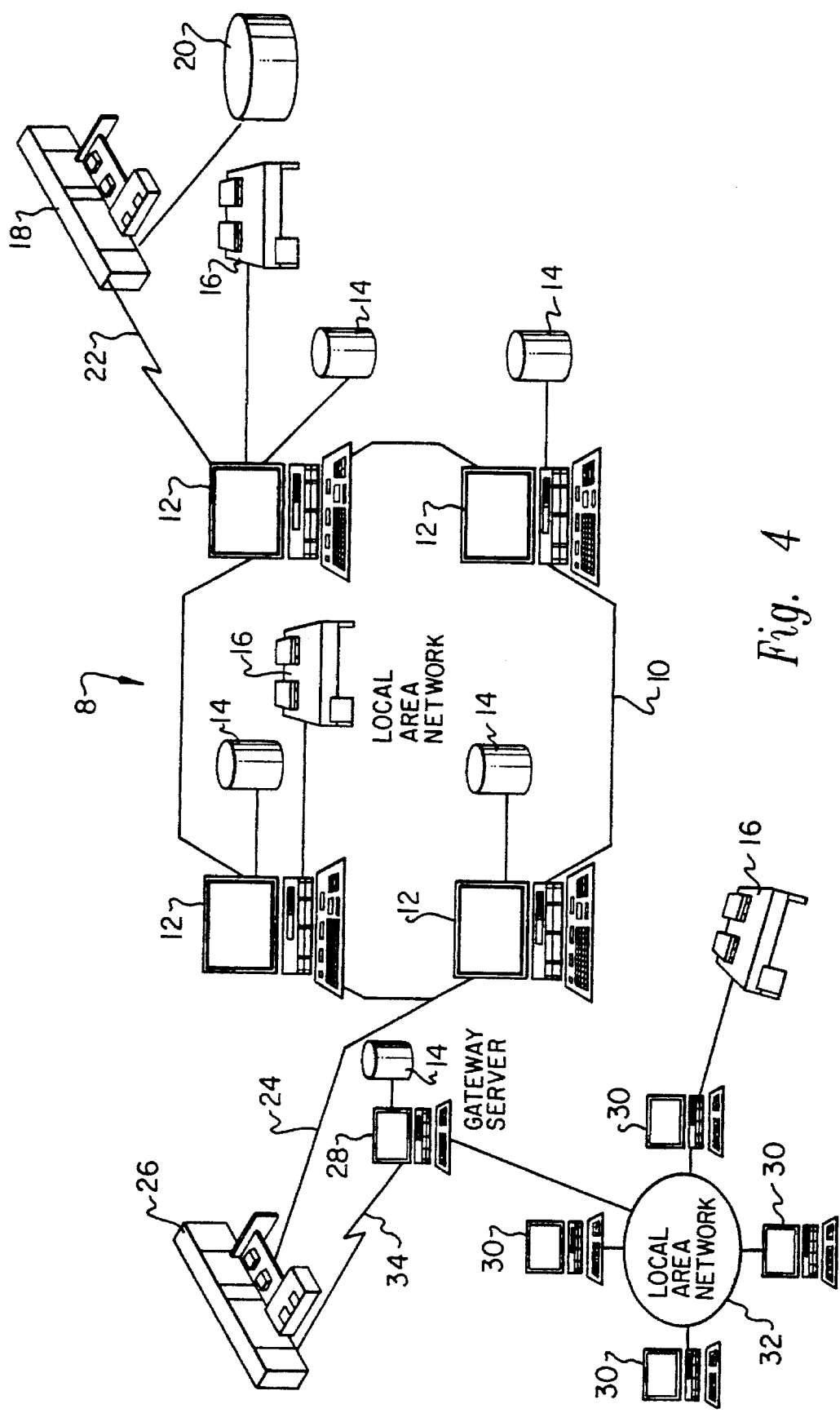
FIG. 4 is a data processing system in which a method and system of the present invention may be implemented in accordance with a preferred embodiment of the present invention.

With reference to FIG. 4, there is depicted a data processing system 8 in which a method and system of the present invention may be implemented. As may be seen, data processing system 8 may include a plurality of networks, such as local area networks (LAN) 10 and 32, each of which preferably includes a plurality of individual computers 12 and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 4, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/390", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects thus stored.

Figure 5:
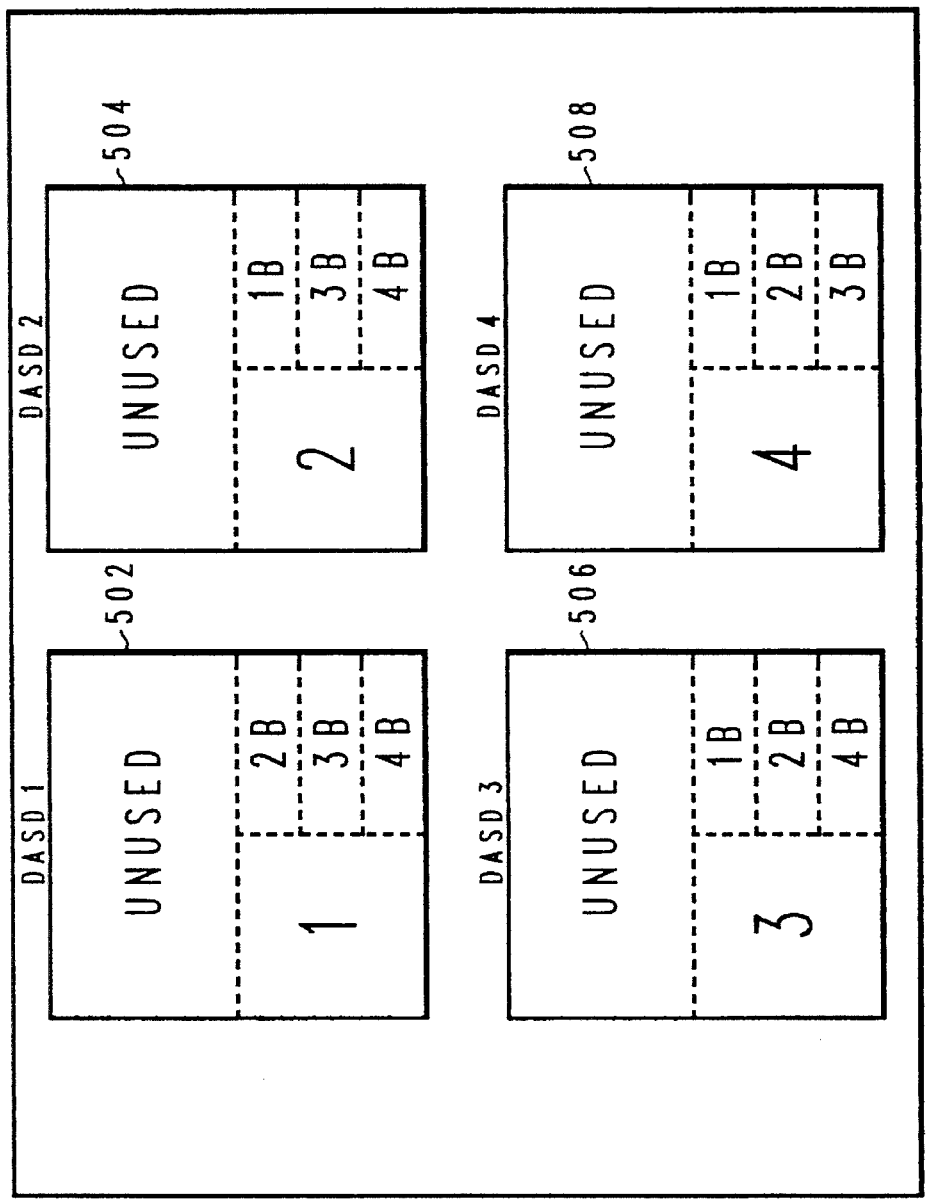
FIG. 5 depicts a block diagram of a distributed mirrored direct access storage device system within the data processing system in FIG. 4 is depicted in accordance with a preferred embodiment of the present invention.

In a preferred embodiment of the present invention storage device 14 may be a mirrored Direct Access Storage Device (DASD) system in which a preferred embodiment of the present invention also may be implemented. Referring now to FIG. 5, a block diagram of a mirrored DASD system is depicted in accordance with a preferred embodiment of the present invention. Distributed mirrored DASD system 500 includes four DASDs: DASD 502, DASD 504, DASD 506, and DASD 508.

Each of these DASDs has a section of primary data: data 1, data 2, data 3, and data 4. Each DASD also includes sections of data containing a portion of the backup data for each of the other DASDs as indicated by data 1b, data 2b, data 3b, and data 4b. If any one of the DASDs fails, data may be retrieved from the other DASD's backup data. For example, if DASD 1 fails all information for DASD 1 may still be read from the other DASD's backup data as indicated by data 1b in DASDs 504, 506, and 508. The failure of a DASD requires recreation of the N+1 environment, if sufficient unused storage space is available, in accordance with a preferred embodiment of the present invention.

Figure 6:
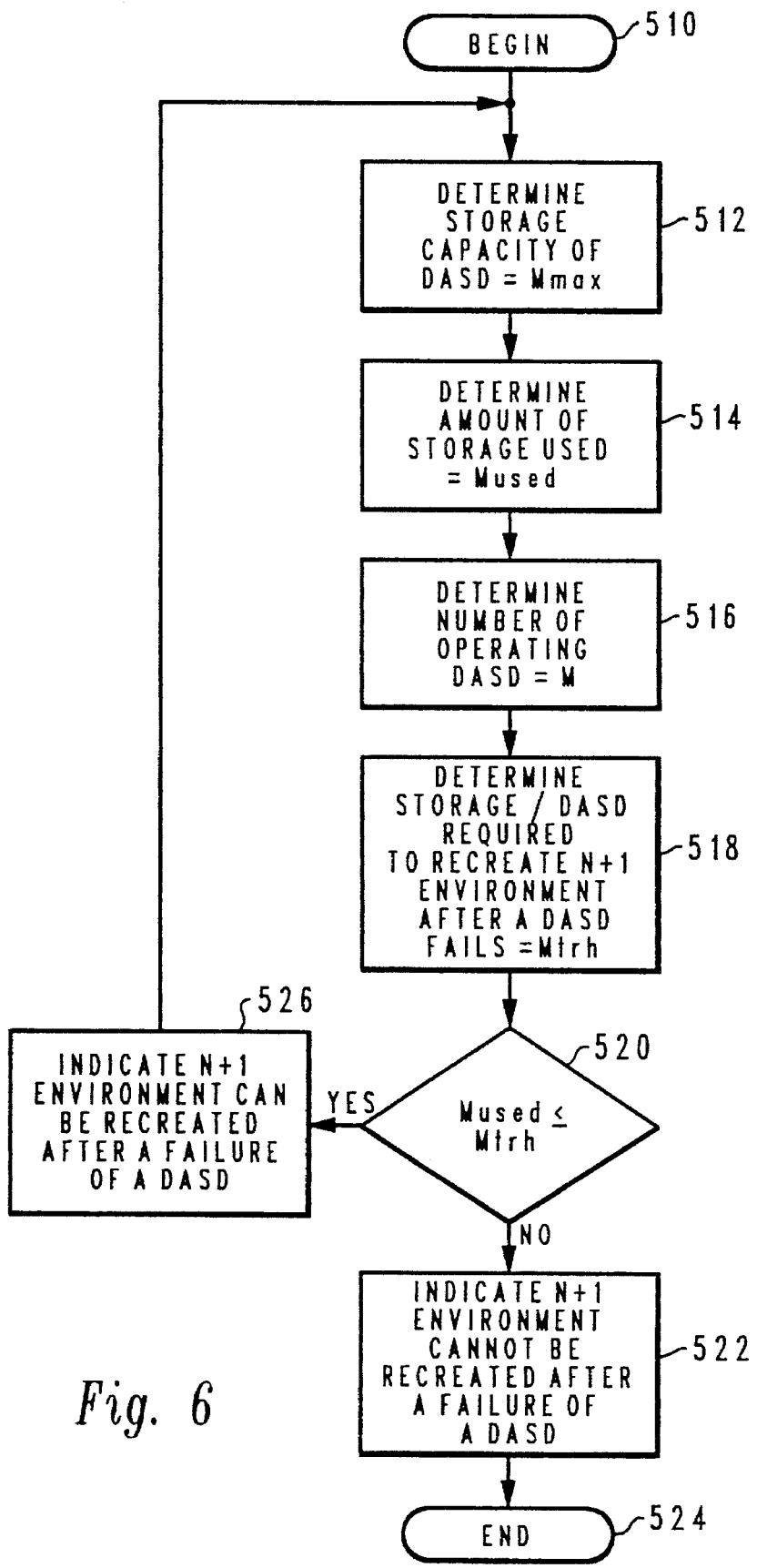
FIG. 6 is a high level logic flowchart illustrating a method and system for managing an N+1 environment in a distributed mirrored direct access storage device system in accordance with a preferred embodiment of the present invention.

Referring now to FIG. 6, a flowchart illustrating a method and system for managing an N+1 environment in a DASD system is depicted in accordance with a preferred embodiment of the present invention. As depicted, the process begins in block 510 and thereafter proceeds to block 512. Block 512 illustrates a determination of the storage capacity of the DASD and sets that storage capacity equal to $M_{max}$. Afterward, the process proceeds to block 514, which depicts a determination of the amount of storage space used. The used storage space is set equal to $M_{used}$. Next, the process advances to block 516. Block 516 illustrates a determination of the number of operating DASD present. The number of operating DASD is set equal to M.

Thereafter, the process proceeds to block 518, which depicts a determination of the storage/DASD required to recreate a N+1 environment after a DASD fails. This value is set equal to $M_{trh}$. The process then advances to block 520, which illustrates a determination of whether or not the Mused is less than or equal to Mtrh. If Mused is greater than Mtrh, the process then advances to block 522. Block 522 depicts an indication that an N+1 environment cannot be recreated after a failure of a DASD. Thereafter the process terminates as illustrated in block 524.

Referring again to block 520, if $M_{used}$ is less than or equal to $M_{trh}$, the process then proceeds to block 526. Block 526 illustrates an indication that an N+1 environment can be recreated after a failure of a DASD.

In some cases a DASD may suffer a partial failure and different sizes of DASDs may be utilized in a DASD system. In such a case, $M_{trh}$ may be set equal to $M_{total} - M_{lost}$. Where $M_{total}$ is set equal to the maximum usable storage and $M_{lost}$ is set equal to the amount of defective storage.

Figure 7:
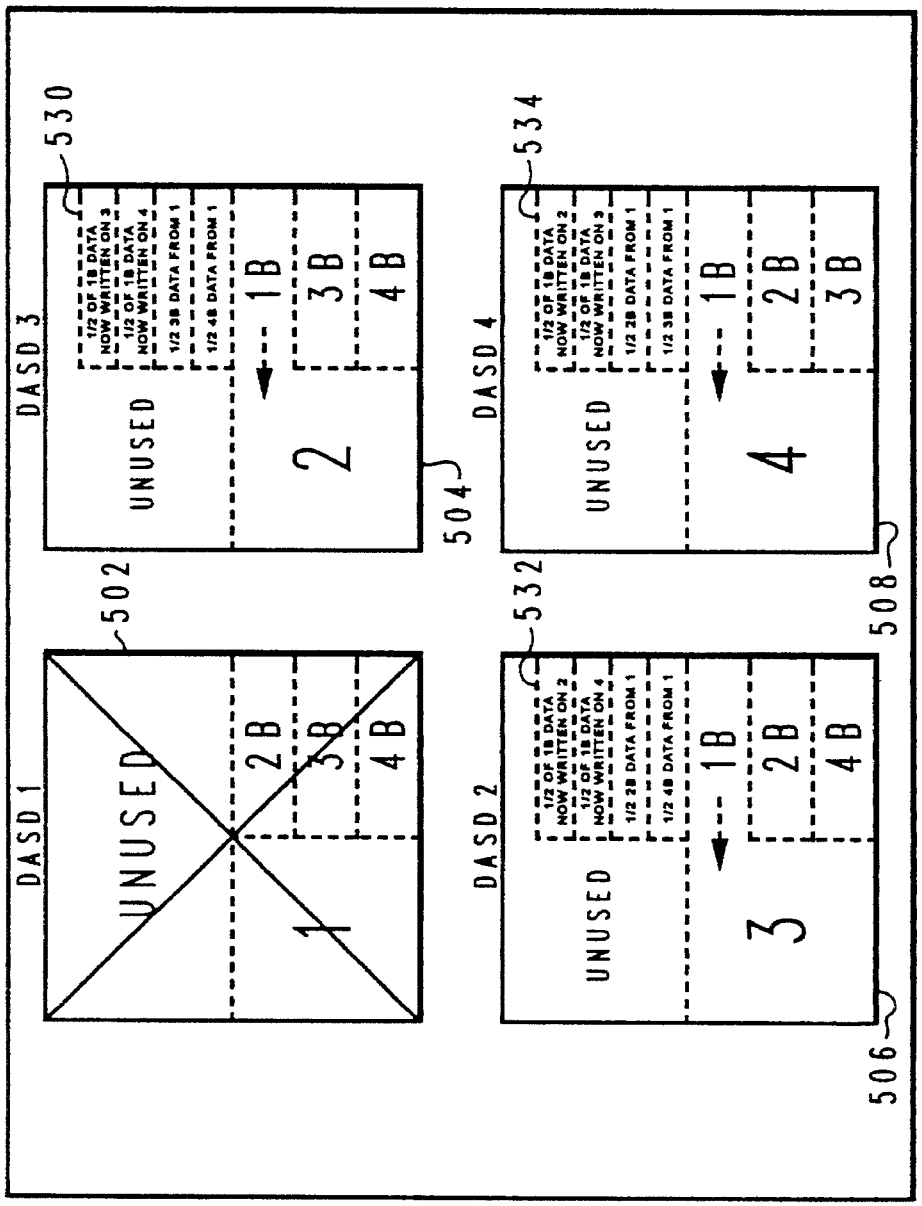
FIG. 7 depicts a block diagram of a distributed mirrored direct access storage device system with a recreated N+1 environment in accordance with a preferred embodiment of the present invention.

Referring now to FIG. 7, a block diagram of a mirrored DASD system with a recreated N+1 environment is depicted in accordance with a preferred embodiment of the present invention. In the event that a DASD is lost, the N+1 environment may be recreated on the remaining DASDs utilizing methods well known to those skilled in the art.

For example, when DASD 1 fails and sufficient unused storage is present to recreate an N+1 environment, backup data 1b is defined to become primary data in each of DASD 2, 3, and 4. New backup data would be created in each of the remaining DASDs to backup the new data that each DASD has accepted now as primary data in accordance with a preferred embodiment of the present invention. In the depicted example, DASD 3 now includes section 530, DASD 2 includes section 532, and DASD 4 includes section 534. Sections 530, 532, and 534 are include pointers indicating where backup data may be found on the remaining DASDs. Additionally, sections 530, 532, and 534 contain backup data that was originally stored on DASD 1. The present invention may also be applied with other redundant data storage methods (not depicted) well known to those skilled in the art, such as parity or check-sum techniques.

Consequently, the perceived reliability of the hardware system may be improved when a redundant unit fails and it is determined that an N+1 environment can still be supported without replacement of the failed redundant unit. Another advantage of the present invention is that the required value of N may be determined based on actual hardware system requirements. Additionally, if the configuration of the hardware system is faulty, the present invention provides for indicating the condition in which the hardware system requirement may exceed the capability of the redundant hardware units to provide an N+1 environment.

Those of ordinary skill in the art will realize that the hardware disclosed could be reasonably implemented in software within a processor and that the processes disclosed could similarly be reasonably implemented in hardware in accordance with a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for managing a plurality of units, wherein said data processing system requires a selected capacity provided by a number of said plurality of units, said method comprising:

dynamically polling said plurality of units to determine a capacity of said plurality of said units;

dynamically determining a requirement of said data processing system for said plurality of units; and generating an indication that a condition exists in which at least one of said plurality of units should be replaced only if said determined requirement of said data processing system is greater than said determined capacity of said plurality of units and one of said plurality of units has failed, wherein replacement of one of said plurality of units is not required unless data processing system demand exceeds a capacity of said plurality of units.

2. The method of claim 1 further comprising generating an indication that a condition exists in which an additional unit should be added to said data processing system if said requirement of said data processing system is greater than said capacity of said plurality of units and a failure of any of said plurality of units is absent.

3. The method of claim 2, wherein said plurality of units supports a N+1 environment.

4. A data processing system for managing a plurality of units, wherein said system requires a selected capacity provided by a number of said plurality of units, said data processing system comprising:

polling means for dynamically polling said plurality of units to determine a capacity of said plurality of said units;

determination means for dynamically determining a requirement of said system for said plurality of units; and generation means for generating an indication that a condition exists in which at least one of said plurality of units should be replaced only if said requirement of said data processing system is greater than said capacity of said plurality of units and one of said plurality of units has failed, wherein replacement of a unit is not required unless the data processing system demand exceeds the capacity of the plurality of units.

5. The data processing system of claim 4 further comprising generation means for generating an indication that a condition exists in which an additional unit should be added to said data processing system if said requirement of said data processing system is greater than said capacity of said plurality of units and a failure of any of said plurality of units is absent.

6. The data processing system of claim 5, wherein said plurality of units is a plurality of power regulators.

7. The data processing system of claim 5, wherein said plurality of units is a plurality of direct access storage devices.

8. The data processing system of claim 5, wherein said plurality of units supports a N+1 environment.

9. An apparatus for managing a plurality of units in a hardware system, wherein said hardware system requires a selected amount of capacity provided by said plurality of units, said apparatus comprising:

means for dynamically polling said plurality of units to determine a capacity of said plurality of units;

means for dynamically determining a requirement of said hardware system for said plurality of units; and means for generating an indication that a condition exists in which at least one of said plurality of units should be replaced only if said requirement of said hardware system is greater than said capacity of said plurality of units and if one of said plurality of units has failed, wherein replacement of a unit is not required unless the hardware system demand exceeds the capacity of said plurality of units.

10. The apparatus of claim 9 further comprising:

means for generating an indication that a condition exists in which at least one additional unit should be added to said plurality of units if said requirement of said hardware system is greater than said capacity of said plurality of units and if a failure of one of said plurality of units is absent.

11. The apparatus of claim 10, wherein said plurality of units are direct access storage devices.

12. The apparatus of claim 10, wherein said plurality of units are power regulators.

13. The apparatus of claim 12 further comprising means for detecting a failure of a unit.

14. The apparatus of claim 13, wherein said plurality of units supports a N+1 environment.

15. The apparatus of claim 14, wherein said capacity of said plurality of units is determined by the number of units.

16. The apparatus of claim 14, wherein said capacity of said plurality of units is determined by a sum of an output of each of said plurality of units.

17. A method in a data processing system for managing a plurality of units, wherein the data processing system requires a selected capacity provided by a number of the plurality of units, said method comprising:

dynamically polling said plurality of units to determine a capacity of said plurality of units;

dynamically determining a non-redundant requirement of said data processing system for said plurality of units; and detecting an existence of a redundant capability provided by said plurality of units, wherein the redundant capability is based on an actual capacity from the plurality of units.

18. The method of claim 17, further comprising:

determining if a redundant capability is present in response to a failure of one of said plurality of units; and indicating a requirement for replacing one of said plurality of units in response to a determination that a redundant capability is absent.

19. The method of claim 17, further comprising:

determining if a redundant capability is present in response to an absence of failure of one of said plurality of units; and indicating a requirement for an additional unit in response to a determination that a redundant capability is absent.

20. An apparatus for managing a plurality of units in a hardware system, wherein said hardware system requires a selected capacity provided by said plurality of units, said apparatus comprising:

polling means for dynamically polling said plurality of units to determine a capacity of said plurality of units;

determination means for determining a non-redundant requirement of said data processing system for said plurality of units; and detection means for detecting an existence of a redundant capability within the hardware system, wherein the redundant capability is based on an actual capacity of said plurality of units compared to a usage of said plurality of units.

21. The apparatus of claim 20, further comprising:

determination means for determining if a redundant capability is present in response to a failure of one of said plurality of units; and indication means for indicating a requirement for replacing one of said plurality of units in response to a determination that a redundant capability is absent.

22. The apparatus of claim 20, further comprising:

determination means for determining if a redundant capability is present in response to an absent of failure of one of said plurality of units; and indication means for indicating a requirement for an additional unit in response to a determination that a redundant capability is absent.

* * * * *

UNITED STATES PATENT AND TRADEMARK OFFICE
CERTIFICATE OF CORRECTION

PATENT NO. : 5,491,786
DATED : February 13, 1996
INVENTOR(S) : Egan et al.

It is certified that error appears in the above-indentified patent and that said Letters Patent is hereby corrected as shown below:

Column 3, line 60: change "N $\doteq$ " to --N + 3--

Signed and Sealed this

Twenty-third Day of July, 1996

Attest:

BRUCE LEHMAN

Attesting Officer      Commissioner of Patents and Trademarks